Figure 4:
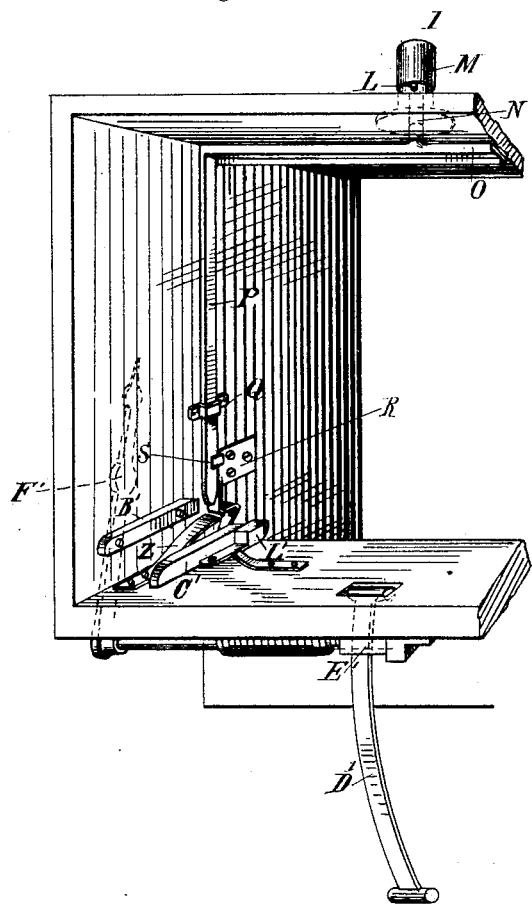

(No Model.) 2 Sheets—Sheet 1.
J. H. HARE & B. P. JOHNSON.
PHOTOGRAPHIC CAMERA.
No. 461,905. Patented Oct. 27, 1891.
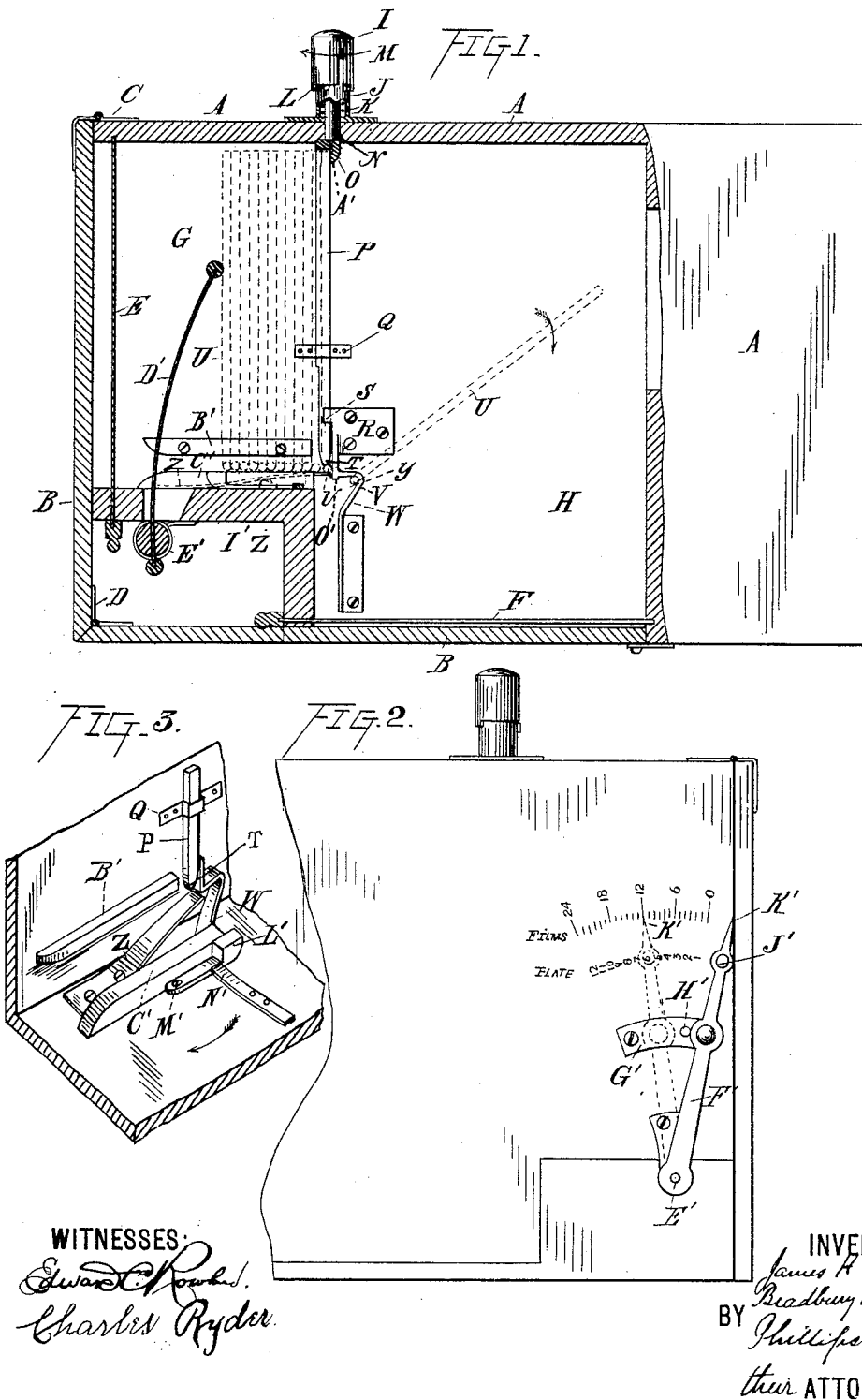
WITNESSES:
Edward C. Rowland
Charles Ryder
INVENTORS:
James H. Hare and
Bradbury P. Johnson
BY Phillips Abbott
their ATTORNEY (No Model.) 2 Sheets—Sheet 2.

J. H. HARE & B. P. JOHNSON.
PHOTOGRAPHIC CAMERA.

No. 461,905. Patented Oct. 27, 1891.

WITNESSES:
Edward C. Rowland
J. E. Hoffman

INVENTORS
James H. Hare and
Bradley P. Johnson
by Phillips Abbott
their atty.

UNITED STATES PATENT OFFICE.

JAMES H. HARE AND BRADBURY P. JOHNSON, OF BROOKLYN, ASSIGNORS TO THE E. & H. T. ANTHONY & COMPANY, OF NEW YORK, N. Y.

PHOTOGRAPHIC CAMERA.

SPECIFICATION forming part of Letters Patent No. 461,905, dated October 27, 1891.

Application filed March 10, 1891. Serial No. 384,479. (No model.)

*To all whom it may concern:*

Be it known that we, JAMES H. HARE, a subject of the Queen of England, and BRADBURY P. JOHNSON, a citizen of the United States, both residents of Brooklyn, in the county of Kings and State of New York, have invented certain new and useful Improvements in Photographic Cameras, of which the following is a specification.

Our invention relates to an improvement in magazine-cameras, and it has special reference to such cameras as are shown in the patent granted to E. B. Barker, No. 407,275, dated July 16, 1889. In this form of camera the plates or frames which support the sensitive surface are depressed for transference from one chamber into the other by pressure applied to the upper part of the frame. By our invention we obviate all liability to jam or bind during the transferring act, and also we supply a device whereby our camera is adapted either to dry plates, which are somewhat thick and heavy, or to films, which are relatively much thinner and lighter.

In the drawings, Figure 1 is a longitudinal vertical section of a camera embodying our invention, the front of the camera being shown in elevation. Fig. 2 is a side elevation showing the index. Fig. 3 is a detail in perspective showing certain of the operative parts. Fig. 4 is a perspective of the invention.

A is the body of the camera.

B is a two-part cover, hinged at C to the body, and at D the two parts are hinged together.

E is one of the slides. F is another. They serve the usual functions of excluding light and giving access when drawn out to the plate-holding chambers.

G is the plate-holding chamber proper, and H is the "storage-chamber," so called.

I is a thumb-piece or cap, which fits over and slides upon the sleeve J, within which is a spring K, which normally elevates the cap I.

L is a stud or pin in the sleeve J, which prevents the depression of the cap I unless it is coincident with the slot M in it. Thus the device is locked and cannot be operated unless the cap I be turned so as to bring the stud L coincident with this slot.

N is a stem which is depressed by the downward movement of the cap I.

O is a frame which extends across the upper part of the camera from side to side and has downwardly-projecting parts P, one on each side of the camera. These parts P preferably slide in grooves made in the side of the box, or they may be guided by clips Q, one or more of them being applied at each side. There is also at or near each end where the strain specially comes a plate R, having a lip S at its upper part, which sustains the part P and holds it in proper relation to the pins on the lower edges of the frames which support the sensitive surface. The lower end of the parts P are made chisel-pointed on both sides, and the adjustment is such that the apex of the point is a little eccentric to and in rear of the central vertical line of the pins on the frame. These frames are shown at U and the pins are shown at V.

W is a guide-plate for the frames during their transference from one chamber to the other. There is one on each side of the camera, and they preferably are each of them offset, as at Y, at their upper parts, so that the frames may under the operation of the depressor P and the spring Z, upon which the pins rest, be pressed or shoved forward into the recesses beneath or in Y, this impulse serving to throw the plates forward, securing their more certain transference from the chamber G into the chamber H. The upper edge of the plates rest against the flange A', formed on the cross-frame, and the rear face of this flange and the front face of the plate R are arranged in exactly the proper position to give the required focus. The lens is, however, usually adjustable. The guides and supports B' C' and spring Z, and pusher D' and its arbor E', and all the other parts of the device are or may be the same as set forth or employed in other similar patents or devices. They form no special part of this invention, excepting in this, that on the end of the arbor E' is a spring-handle F', whereby the arbor is manipulated. This has a finger or pointer K', and to the handle by its resilliency is normally pressed against the plate G' during use, and on this plate is a pin H', against which the handle F' may rest, whereby it, and of course the pointer on its end, is held against the stress of the spring, which presses the pusher forward against the plates. This pointer not only serves the purpose of a lever to control and manipulate the pusher D' through the arbor E', but it also acts as a double indicator to show the number of exposures that have been made—that is to say, there is an opening J' through it near its end, through which the figures from "1" to "12," inclusive, marked upon the side of the camera will successively appear as each exposure is made, and the apex or point of this lever (marked K') will indicate on a smaller scale, from "0" to "24," the number of exposures that have been made of the film-surfaces, which of course are thinner, and, in fact, about half as thick as the dry plates. Thus this indicator will register the number of exposures made, whether dry plates or films be used, and in order that provision may be made for the support of the films we provide two swinging supports L', (see Fig. 3,) which are pivoted at M' to the case, so that they may be swung around in the direction of the arrow, and when so swung they project somewhat beyond the end of the supports C'. Thus they are adapted to engage with and support the thinner films, or rather the thin frames, which support the films. The spring N', which is adjusted to normally spring up in front of the support L', is depressed while it is passing over them, and holds the support L' in position when in use. There may be two of these springs, one on each side, to engage with each one of the supports L'; but we prefer to make it a continuous spring extending from side to side of the camera, the ends whereof are loose, and they spring upwardly to lock the supports L' in position, as above stated.

The operation is as follows: When desiring to transfer a plate from one chamber to the other after having made an exposure, the operator turns the cap I, so that the pin L comes coincident with the slot M. Then by pressing upon the cap the side frames P are carried down, the point T impinges upon the pins V, each projecting laterally beyond the lower side edges of the frames. This also depresses the spring Z. The plate is thus positively carried down, not by pressure upon its upper part, but by this positive and exact pressure upon the pins, and as soon as the spring has been sufficiently depressed, it passes by the point O' of the guides W. Then the conjoint action of the chisel-points T and of the springs Z (these parts being of course duplicated on each side of the camera) throws the frame forward into the recesses beneath or in the offset Y of the guides W, and this forward impulse removes the upper edge of the frame from engagement with the flange or ledge A' and the frame is thrown over into the chamber H. While this is taking place the index-finger F' of course indicates the exposures, as above intimated.

When using films instead of the thicker dry plates, or, for that matter, wet plates, then the supplemental supports L' are swung into position and the device operated as before.

Having described our invention, we claim—

1. In a magazine-camera having a plate-chamber and a plate-storage chamber, the combination of a vertically-moving depressor-frame, springs for the support of the plate-frames, and laterally-projecting pins on the plate-frames, which are engaged by the vertically-moving depressor-frames, substantially as set forth.

2. In a magazine-camera having a plate-chamber and a plate-storage chamber, the combination of a vertically-moving depressor-frame, operated by a device upon the exterior of the camera, which is provided with a locking means, springs for the support of the plate-frames and laterally-projecting pins on the frames, substantially as set forth.

3. In a magazine-camera, the combination of plate-frames having laterally-projecting pins, a yielding support for the frames, and a depressor-frame which engages with the said pins, substantially as set forth.

4. In a magazine-camera, the combination of plate-frames having laterally-projecting pins, a yielding support for the frames, a depressor-frame which engages with the said pins, means on the exterior of the camera for operating the depressor-frame, and a locking device for said means, substantially as set forth.

5. In a magazine-camera, the combination of frames for the support of the plate or sensitive surface provided with laterally-projecting pins, a yielding support for said frames, a vertically-moving depressor-frame which engages with said pins, the point of contact between the pins and frame being at an angle, whereby the frames are thrust forward when unsupported, substantially as set forth.

6. The combination, in a magazine-camera, of a vertically-moving depressor-frame which engages with pins upon the plate-frames, a rigid vertical suppport and a yielding horizontal support for said frames, the said frames and pins themselves, and guides for the plates during their transfer from one chamber to the other, substantially as set forth.

7. In a magazine-camera, the combination of a two-part support for the frames which sustain the sensitive surfaces, one part being fixed and the other adjustable, whereby sensitive surfaces or their frames of differing thicknesses may be used, substantially as set forth.

8. In a magazine-camera, the combination of frames for the support of the sensitive surface, a yielding support for the said frames, and a non-yielding support which is extendible lengthwise of the camera, whereby frames of differing thickness will be supported irrespective of the depression of the yielding support, substantially as set forth.

Signed at New York, in the county of New York and State of New York, this 6th day of March, A. D. 1891.

JAMES H. HARE.
BRADBURY P. JOHNSON.

Witnesses:
PHILLIPS ABBOTT,
J. E. HOFFMAN.